(12) United States Patent
Toda et al.

(10) Patent No.: US 9,493,001 B2
(45) Date of Patent: Nov. 15, 2016

(54) INKJET RECORDING METHOD, INKJET RECORDED MATTER, AND INKJET RECORDING DEVICE

(71) Applicants: Naohiro Toda, Kanagawa (JP); Hidefumi Nagashima, Kanagawa (JP); Tomohiro Nakagawa, Kanagawa (JP); Juichi Furukawa, Kanagawa (JP); Ichiroh Fujii, Kanagawa (JP)

(72) Inventors: Naohiro Toda, Kanagawa (JP); Hidefumi Nagashima, Kanagawa (JP); Tomohiro Nakagawa, Kanagawa (JP); Juichi Furukawa, Kanagawa (JP); Ichiroh Fujii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/645,562

(22) Filed: Mar. 12, 2015

(65) Prior Publication Data

US 2015/0258783 A1 Sep. 17, 2015

(30) Foreign Application Priority Data

Mar. 14, 2014 (JP) ................. 2014-051120

(51) Int. Cl.
*B41J 2/21* (2006.01)
*B41J 2/14* (2006.01)
*B41M 5/00* (2006.01)

(52) U.S. Cl.
CPC ............... *B41J 2/14* (2013.01); *B41J 2/2107* (2013.01); *B41J 2/2114* (2013.01); *B41M 5/0011* (2013.01); *Y10T 428/24901* (2015.01)

(58) Field of Classification Search
CPC .......... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC .................................... 347/95–105
See application file for complete search history.

(56) References Cited

U.S. PATENT DOCUMENTS

2008/0276833 A1* 11/2008 Sasaki .................... C09D 11/30
106/31.13
2012/0176455 A1* 7/2012 Ohta .................... B41M 5/0011
347/102
2012/0227619 A1* 9/2012 Koganehira ........... C09D 11/14
106/31.13

(Continued)

FOREIGN PATENT DOCUMENTS

| JP | 2005-220352 | 8/2005 |
|---|---|---|
| JP | 2011-094082 | 5/2011 |
| JP | 2011-201230 | 10/2011 |

OTHER PUBLICATIONS

Material Safety Data Sheet (MSDS); 2,3-Butanediol; Feb. 28, 2011; SIGMA-ALDRICH; pp. 1-5.*

(Continued)

*Primary Examiner* — Manish S Shah
(74) *Attorney, Agent, or Firm* — Cooper & Dunham LLP

(57) ABSTRACT

An inkjet recording method includes ejecting an ink having a temperature from 28° C. to 40° C. and attaching the ink to a non-porous substrate having a temperature 5° C. to 20° C. higher than that of the ink, wherein the ink contains a colorant, resin particles, water, a hydrosoluble organic solvent, and a silicone-based surfactant, wherein the silicone-based surfactant accounts for 1% by weight to 3% by weight in the ink.

8 Claims, 1 Drawing Sheet

(56) References Cited

U.S. PATENT DOCUMENTS

| | | |
|---|---|---|
| 2013/0065028 A1* | 3/2013 | Fujii ............ C09D 7/001 347/20 |
| 2014/0192112 A1 | 7/2014 | Nagashima et al. |
| 2014/0267520 A1 | 9/2014 | Toda et al. |
| 2014/0377516 A1 | 12/2014 | Toda et al. |
| 2015/0017396 A1 | 1/2015 | Nakagawa et al. |
| 2015/0050467 A1 | 2/2015 | Nakagawa et al. |

OTHER PUBLICATIONS

Material Safety Data Sheet (MSDS); Propylene glycol; May 21, 2013; ScienceLab.com; pp. 1-6.*
U.S. Appl. No. 14/482,134, filed Sep. 10, 2014.
U.S. Appl. No. 14/472,458, filed Aug. 29, 2014.
U.S. Appl. No. 14/505,576, filed Oct. 3, 2014.
U.S. Appl. No. 14/541,396, filed Nov. 14, 2014.

* cited by examiner

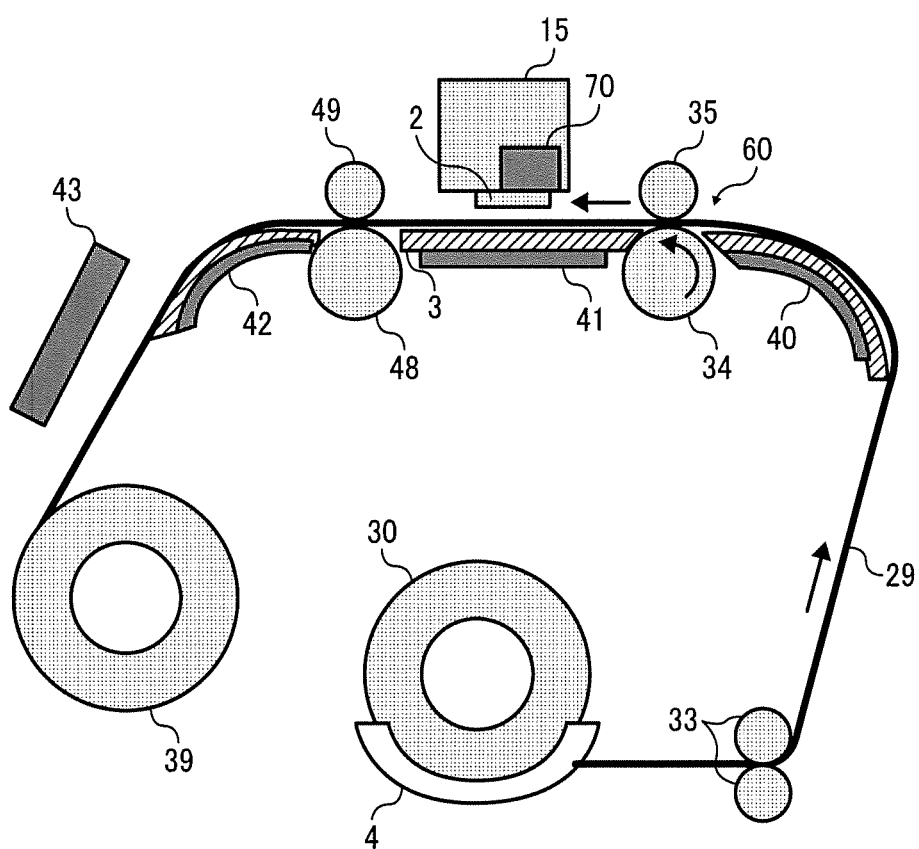

INKJET RECORDING METHOD, INKJET RECORDED MATTER, AND INKJET RECORDING DEVICE

CROSS-REFERENCE TO RELATED APPLICATIONS

This patent application is based on and claims priority pursuant to 35 U.S.C. §119(a) to Japanese Patent Application No. 2014-051120, filed on Mar. 14, 2014, in the Japan Patent Office, the entire disclosure of which is hereby incorporated by reference herein.

BACKGROUND

1. Technical Field

The present invention relates to an inkjet recording method, inkjet recorded matter, and an inkjet recording device.

2. Description the Background Art

Since inkjet printers are relatively quiet, enjoy low running costs, and are easily capable of printing color images, they are now widely used at home as output device of digital signals.

In recent years, inkjet technologies have been appealing in business field of, for example, display, posters, and signboards in addition to home use.

As the ink for inkjet recording, solvent-based inkjet ink containing a resin dissolved in an organic solvent as a vehicle or ultraviolet-curable inkjet ink using a polymerizable monomer as its main component have been widely used.

These days, an inkjet technology using an aqueous ink widely used at home for industrial use have been developed because it is less burden on the environment.

In addition, to increase the printing speed, a method heating during printing is also researched and developed.

SUMMARY

The present invention provides an improved inkjet recording method including ejecting an ink having a temperature from 28° C. to 40° C.; attaching the ink to a non-porous substrate having a temperature 5° C. to 20° C. higher than that of the ink, wherein the ink contains a colorant, resin particles, water, a hydrosoluble organic solvent, and a silicone-based surfactant, wherein the silicone-based surfactant accounts for 1% by weight to 3% by weight in the ink.

BRIEF DESCRIPTION OF THE DRAWING

Various other objects, features and attendant advantages of the present invention will be more fully appreciated as the same become better understood from the detailed description when considered in connection with the accompanying drawings, in which like reference characters designate like corresponding parts throughout and wherein FIGURE is a diagram illustrating an ink jet recording device according to an embodiment of the present invention.

DETAILED DESCRIPTION

In the present invention, an inkjet recording method is provided which is capable of printing with high level of image gloss and excellent fixability while lowering occurrence of bad ejection.

As a result of investigation and observation of ink formulation and ink stability, the present inventors have found that the gloss at printed portion ameliorates without causing bad ejection of the ink when an ink contains a particular amount of a silicone-based surfactant and the temperature of the ink kept in a particular temperature range is ejected to attach it to a substrate having a particular temperature difference. Thus, the present invention was made. This mechanism is not clear but can be inferred that if the temperature of an ink containing a particular amount of a silicone-based surfactant is raised, the silicone-based surfactant can be easily aligned to the interface of the ink fluid and air at the ejection portion so that emulsions at the interface do not easily agglomerate at the interface and in addition, rapid agglomeration of resin emulsions is prevented by the silicone-based surfactant when the ink is ejected to a heated non-permeating medium.

The present invention includes: 1. An inkjet recording method including: ejecting an ink having a temperature from 28° C. to 40° C.; attaching the ink to a non-porous substrate having a temperature 5° C. to 20° C. higher than that of the ink; wherein the ink contains a colorant, resin particles, water, a hydrosoluble organic solvent, and a silicone-based surfactant, wherein the silicone-based surfactant accounts for 1% by weight to 3% by weight in the ink.

The embodiment 1 will be described below in detail with reference to the accompanying drawing. The embodiment 1 of the present disclosure includes the following 2 to 8. Therefore, these are also described.

2. The inkjet recording method according to 1 mentioned above, wherein in the step of ejecting an ink having a temperature from 28° C. to 40° C., the ink is heated to 28° C. to 40° C.

3. The inkjet recording method according to 1 or 2 mentioned above, wherein the hydrosoluble organic solvent contains at least one of propylene glycol or 2,3-butane diol.

4. The inkjet recording method according to any one of 1 to 3 mentioned above, wherein the hydrosoluble organic solvent contains at least one of propylene glycol or 2,3-butane diol.

5. The inkjet recording method according to any one of 1 to 4 mentioned above, wherein 50% by weight or more of the hydrosoluble organic solvent has a boiling point lower than 200° C.

6. The inkjet recording method of any one of 1 to 5 mentioned above, wherein the hydrosoluble organic solvent has a boiling point of 250° C. or lower.

7. Inkjet printed matter containing: a recording medium; and an image formed on the recording medium by utilizing the inkjet recording method of any one of 1 to 5 mentioned above.

8. An inkjet recording device including: an ink containing a colorant, resin particles, water, a hydrosoluble organic solvent, and a silicone-based surfactant accounting for 1% by weight to 3% by weight in the ink; a temperature controller to control the temperature of the ink in a range of from 28° C. to 40° C.; an ejection device to eject the ink; and a substrate heater to heat a substrate to a temperature 5° C. to 20° C. higher than that of the ink.

The ink contains at least a colorant, resin particles, water, a hydrosoluble organic solvent, and a silicone-based surfactant. The ink is described in detail below.

Colorant

The colorant can be inorganic or non-organic and preferably has a good affinity with the hydrosoluble organic solvent.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

As organic pigments, azo pigments (azo lakes, insoluble azo pigments, condensed azo pigments, chelate azo pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinofuranone pigments, etc.), dye chelates (basic dye type chelates, acid dye type chelates), nitro pigments, nitroso pigments, and aniline black can be used.

Specific preferred examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific preferred examples of the pigments for color include, but are not limited to, C.I. Pigment Yellow 1, 3, 12, 13, 14, 17, 24, 34, 35, 37, 42 (yellow iron oxide), 53, 55, 81, 83, 95, 97, 98, 100, 101, 104, 108, 109, 110, 117, 120, 138, 150, and 153; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19, 23, and 38; C.I. Pigment Blue 1, 2, 15 (Phthalocyanine blue), 15:1, 15:2, 15:3 (Phthalocyanine Blue), 16, 17:1, 56, 60, and 63; C.I. Pigment Green 1, 4, 7, 8, 10, 17, 18, and 36.

The surface area of the pigment is preferably from about 10 m$^2$/g to about 1,500 m$^2$/g, more preferably from about 20 m$^2$/g to about 600 m$^2$/g, and furthermore preferably about 50 m$^2$/g to about 300 m$^2$/g. Unless a pigment has such a desired surface area, it is suitable that the pigment is subject to size reduction treatment or pulverization treatment (for example, ball mill treatment, jet mill treatment, or ultrasonic wave treatment).

Pigments can be dispersed in an ink by a dispersion method using a surfactant or a dispersible resin, a dispersion method of coating the surface of pigment with a resin, and a dispersion method of forming a self-dispersible pigment by introducing a hydrophilic group into the surface of pigment.

The volume average particle diameter (D50) of the pigment in an ink is preferably from 10 nm to 200 nm and more preferably from 20 nm to 150 nm. Within this range, it is easy to obtain a good level of ejection stability and improve the image density and the image quality because dispersion stability is good. In addition, it is easy to conduct dispersion and classification, which is preferable in terms of ease of manufacturing an ink.

The content of the pigment in an ink preferably ranges from about 0.1% by weight to about 10% by weight and more preferably from about 1% by weight to about 10% by weight in terms of ameliorating the image density, fixability, and ejection stability.

Resin Particle

It is preferable that the resin for use in the present disclosure is added to an ink in a form of a resin emulsion in which the resin is dispersed in water.

There is no specific limit to the identity of the resin particles. The resin particles can be selected to each of a particular application. Specific examples thereof include, but are not limited to, urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins. Of these, in terms of fixability and ink stability, emulsions of urethane resins or acrylic-based resins are preferable. Moreover, a dispersant such as a surfactant can be optionally added to a resin emulsion. In particular, a so-called self-emulsifiable resin emulsion is preferable in terms of applied film's performance. In terms of hydrodispersibility, it is preferable to contain an anionic group within an acid value range of from 5 mgKOH/g to 100 mgKOH/g and, more preferable, from 5 mgKOH/g to 50 mgKOH/g to impart excellent abrasion resistance and chemical resistance.

In addition, it is possible to obtain good hydrodispersibility by using carboxylic group, sulfonic acid group, etc. as anionic group. To introduce such an anionic group into a resin, it is suitable to use a monomer having such an anionic group.

The resin emulsion can be synthesized or is available on market.

Specific examples of the resin emulsions available on market include, but are not limited to, SUPERFLEX® 130 (polyether-based urethane resin emulsion, manufactured by DAI-ICHI KOGYO SEIYAKU CO., LTD.), JONCRYL® 537 (acrylic resin emulsion, manufactured by BASF SE), Microgel E-1002 and E-5002 (styrene-acrylic-based resin emulsion, manufactured by Nippon Paint Co., Ltd.), Voncoat 4001 (acrylic-based resin emulsion, manufactured by Dainippon Ink and Chemicals, Inc.), Voncoat 5454 (styrene-acrylic-based resin emulsion, manufactured by Dainippon Ink and Chemicals, Inc.), SAE-1014 (styrene-acrylic-based resin emulsion, manufactured by Nippon Zeon Co., Ltd.), and Saivinol SK-200 (acrylic-based resin emulsion, manufactured by Saiden Chemical Industry Co., Ltd.), Primal AC-22 and AC-61 (acrylic-based resin emulsion, manufactured by The Dow Chemical Company), NANOCRYL SBCX-2821 and 3689 (acrylic-silicone-based resin emulsion, manufactured by Toyo Ink Co., Ltd.), and #3070 (methyl methacrylate polymer resin emulsion, manufactured by MIKUNI COLOR LTD.).

In addition, with regard to the particle diameter of the resin emulsion, considering the usage of these in an inkjet recording device, the volume average particle diameter is preferably from 10 nm to 1,000 nm and more preferably from 20 nm to 50 nm. When a resin emulsion having a volume average particle diameter of from 20 nm to 50 nm, the contact between the surface of the resin dispersed in an ink and the silicone-based surfactant increases so that the dispersibility of the resin emulsion increases and the smoothness of an ink layer is improved when the layer is formed. As a result, a higher level of gloss is obtained.

The volume average particle diameter can be measured by using a particle size analyzer (Microtrac MODEL UPA 9340, manufactured by Nikkiso Co., Ltd.).

The content of the resin emulsion in an ink is preferably from 1% by weight to 10% by weight in terms of fixability and ink stability and more preferably from 5% by weight to 10% by weight to improve smoothness of an ink layer, obtain a high level of image gloss, and ameliorate fixability to a substrate.

Moreover, the content of the resin in an ink is increased to the content of a pigment or more, preferably at least the double, it is possible to obtain a higher grade of image gloss and abrasion resistance.

In the present disclosure, in particular, a higher grade of image gloss is obtained by using a polycarbonate-based urethane resin of the resin emulsions mentioned above, which is more preferable.

The polycarbonate-based urethane resin is obtained by reaction conducted between polycarbonate polyol and polyisocyanate.

It is possible to use as the polycarbonate polyol mentioned above polyols prepared by, for example, ester exchange reaction of a carboxylic acid ester and a polyol under the presence of a catalyst or reaction between phosgene and bisphenol A.

Specific examples of the carboxylic acid ester mentioned above include, but are not limited, to methyl carbonate, dimethyl carbonate, ethyl carbonate, diethyl carbonate, cyclocarbonate, and diphenyl carbonate. Specific examples of the polyol mentioned above to react with the carboxylic acid ester include, but are not limited, low-molecular weight diol compounds such as ethylene glycol, diethylene glycol, 1,2,-propylene glycol, dipropylene glycol, 1,4-butane diol, 1,5-pentane diol, 3-methyl-1,5-pentane diol, 1,6-hexane diol, neopentyl glycol, and 1,4-cyclohexane diol; polyethylene glycol, and polypropylene glycol.

There is no specific limit to the polyisocyanate mentioned above. Specific examples thereof include, but are not limited to, aromatic polyisocyante compounds such as 1,3-phenylene diisocyanate, 1,4-phenylene diisocyanate, 2,4-tolylene diisocyanate (TDI), 2,6-tolylene diisocyanate, 4,4'-diphenylene methane diisocyanate (MDI), 2,4-diphenyl methane diisocyanate, 4,4'-diisocynato biphenyl, 3,3'-dimethyl-4,4'-diisocyanate biphenyl, 3,3'-dimethyl-4,4'-diisocyanate, diphenyl methane, 1,5-naphtylene diisocyanate, m-isocyanate pheny sulphonyl isocyanate, p-isocyanate phenyl sulfonyl isocyanate, and p-isocyanate phenyl sulfonyl isocyante; aliphatic polyisocyanates compounds such as ethylene diisocyanate, tetramethylene diisocyanate, hexamethylene diisocyanate (HDI), dodecamethylene diisocyanate, 1,6,11-undecane triisocyanate, 2,2,4-trimethyl hexamethylene diisocyanate, lysine diisocyanate, 2,6-diisocyante methylcaproate, bis(2-isocyanate ethyl)fumarate, bis(2-isocyanateethyl)carbonate, and 2-isocyanate ethyl-2,6-diisocyanate hexanoate; and alicyclic polycyanate compounds such as isophorone diisocyante (IPDI), 4,4'dicyclohexyl methane diisocyanate (hydrogenated MDI), cyclohexylene diisocyante, methylcyclohexylene diisocyanate (hydrogenated TDI), bis(2-isocyanateethyl)-4-dichlorohexene-1,2-dicarboxylate, 2,5-norbornane diisocyante, and 2,6-norbonane diisocyante.

These can be used alone or in combination.

Hydrosoluble Organic Solvent

Hydrosoluble organic solvents contained in ink are usable.

Specific examples thereof include, but are not limited to, polyols such as ethylene glycol, propylene glycol, 1,2-propane glycol, 1,3-propane glycol, 1,2-butane diol, 1,3-butane diol, 2,3-butane diol, 1,4-butane diol, 2-methyl-2,4-pentane diol, diethylene glycol, triethylene glycol, dipropylene glycol, 2,2-dimethyl-1,3-propane diol, 2-methyl-1,3-propane diol, 1,2-pentane diol, 2,4-pentane diol, 1,5-pentane diol, 1,6-hexane diol, 2-ethyl-1,3-hexane diol, and 2,5-hexane diol, polyol alkyl ethers such as dipropylene glycol monomethyl ether, propylene glycol-n-butyl ether, propylene glycol-t-butyl ether, diethylene glycol methyl ether, ethylene glycol-n-propyl ether, ethylene glycol-n-butyl ether, dipropylene glycol-n-propyl ether, tripropylene glycol methyl ether, tripeopylene glycol-n-propyl ether, propylene glycol phenyl ether, triethylene glycol methyl ether, triethylene glycol methyl ether, triethylene glycol ethyl ether, diethylene glycol-n-hexyl ether, and ethylene glycol phenyl ether; esters such as ethy lactate; nitrogen-containing heterocyclic compounds such as N-methyl-2-pyrroridone, N-hydroxyethyl-2-pyrroridone, 2-pyrroridone, 1,3-dimethyl imidazolidinone, and ε-caprolactome; amides such as formamide, N-methyl formamide, and N.N-dimethyl form amide; amines such as monoethanol amine, diethanol amine, triethanol amine, monoethyl amine, diethyl amine, and triethyl amine; and sulfur-containing compounds such as dimethyl sulfoxide, sulforane, thiodiethanol, and thiodiglycol.

These can be used alone or two or more kinds thereof can be used in combination.

The total content of the hydrosoluble organic solvent in the ink is preferably from 20% by weight to 70% by weight and more preferably from 30% by weight to 60% by weight. When the total amount is 20% by weight or more, the ink is not easily dried so that the ejection stability thereof becomes good. When it is 70% by weight or less, the viscosity of the ink remains not so high, which is advantageous in terms of ink ejection.

In addition, a mixture of propylene glycol (boiling point: 188° C.) and 2,3-butane diol (boiling point: 183° C.) is preferable as the hydrosoluble organic solvent to obtain a higher grade of image gloss. The content of these diols in the ink is preferably from 3% by weight to 35% by weight and more preferably from 5% by weight to 25% by weight.

In addition, 50% by weight or more of the hydrosoluble organic solvent contained in an ink preferably has a boiling point lower than 200° C. to improve drying property.

In addition, when no hydrosoluble organic solvent having a boiling point higher than 250° C. is contained, drying properties are further improved.

Silicone-Based Surfactant

The silicone-based surfactant accounts for 1% by weight to 3% by weight of the ink of the present disclosure. For this reason, the silicone-based surfactant achieves stability in particular in the ink heated to the temperature range of from 28° C. to 40° C. and, by heating a non-porous substrate 5° C. to 20° C. higher than the temperature of the ink, the ink ejected forms a smooth film, thereby ameliorating the image gloss.

There is no specific limit to the silicone-based surfactant. The silicone-based surfactant can be suitably selected to a particular application. Silicone-based surfactants are preferable which are not decomposed even at a high pH. Specific examples thereof include, but are not limited to, side-chain-modified polydimethylsiloxane, both end-modified polydimethylsiloxane, one end modified polydimethylsiloxane, and side-chain both end modified polydimethylsiloxane. A silicone-based surface active agent that has a polyoxyethylene group and/or a polyoxyethylene polyoxypropylene group is particularly preferable because such an agent demonstrates good characteristics as an aqueous surface active agent.

It is possible to use a polyether-modified silicone-based surfactant as the silicone-based surfactant. A specific example thereof is a compound in which a polyalkylene oxide structure is introduced into the side chain of the Si portion of dimethyl silooxane.

When the content of the silicone-based surfactant is less than 1% by weight, the ink is not easily ejected, which leads to production of defective images having streaks or low image gloss. When the content is greater than 3% by weight, fusion inhibition of a resin emulsion tends to occur, so that the applied film has a low robustness.

In addition, it is possible to add other surfactants in addition to the silicone-based surfactant.

A specific example of the other surfactant is a fluorine-containing surfactant.

Specific examples of the fluorine-containing surface active agents include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These are particularly preferable because they have low foaming property.

Specific examples of the perfluoroalkyl sulfonic acid compounds include, but are not limited to, perfluoroalkyl sulfonic acid and salts of perfluoroalkylsulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain.

Counter ions of salts in these fluorine-based surface active agents are, for example, Li, Na, K, $NH_4$, $NH_3CH_2CH_2OH$, $NH_2(CH_2CH_2OH)_2$, and $NH(CH_2CH_2OH)_3$.

The other surfactants other than the fluorine-containing surfactant are amphoteric surfactants, nonionic surfactants, anionic surfactants, etc.

It is preferable that the total content of the surfactant including the silicone-based surfactant and the other surfactant is preferably from 1% by weight to 5% by weight in the entire ink. When the content of the silicone-based surfactant is less than 1% by weight, the ink is not easily ejected, which leads to production of defective images having streaks or low image gloss. When the content is greater than 5% by weight, fusion inhibition of a resin emulsion tends to occur, the applied film has a low level of image gloss and a low robustness.

Other Additives

Examples of other additives to the ink include preservatives and fungicides, corrosion inhibitors, and pH regulators.

Specific examples of the preservatives and fungicides include, but are not limited to, 1,2-benzisothiazoline-3-on, sodium benzoate, dehydrosodium acetate, sodium sorbate, pentachlorophenol sodium, and 2-pyridine thiol-1-oxide sodium.

Specific examples of the corrosion inhibitors include, but are not limited to, acidic sulfite, thiosodium sulfate, ammonium thiodiglycolate, diisopropyl ammonium nitrite, pentaerythritol tetranitrate, and dicyclohexyl ammonium nitrite.

Suitable pH regulators can adjust the pH to a desired value without having an adverse impact on an ink to be formulated. Specific examples thereof include, but are not limited to, hydroxides of alkali metal elements such as lithium hydroxide, sodium hydroxide, and potassium hydroxide; carbonates of alkali metals such as lithium carbonate, sodium carbonate, and potassium carbonate; hydroxides of quaternary ammonium, amines such as diethanol amine and triethanol amine; ammonium hydroxide, and hydroxides of quaternary phosphonium.

The ink for use in the present disclosure can be manufactured by adding water to the formulation mentioned above by optional stirring and mixing. A stirrer using a typical stirring blade, a magnetic stirrer, a high performance disperser etc., can be used for the mixing and stirring. However, it is not limited to particular methods. Known methods are employed to particular applications.

Inkjet Recording Method

The inkjet recording method of the present disclosure is described. The inkjet recording method of the present disclosure includes steps of ejecting an ink whose temperature is controlled to be from 28° C. to 40° C. and attaching the ink ejected to a non-porous substrate whose temperature is controlled 5° C. to 20° C. higher than that of the ink.

The inkjet recording method of the present disclosure includes steps of ejecting an ink whose temperature is controlled to be from 28° C. to 40° C. for image printing by applying a stimulus thereto and attaching the ink ejected to a non-porous substrate whose temperature is controlled to be higher than that of the ink.

The ink ejection process is to apply a stimulus to an ink to eject it for image printing.

The device to eject the ink is appropriately selected to particular applications without any limitation. A specific example thereof is a recording head (ink ejection head). In particular, an ink ejection device is preferable which has a head having multiple nozzle arrays and a sub-tank that accommodates an ink supplied from an ink cartridge and supplies the liquid to the head. It is preferable that the sub-tank mentioned above has a negative pressure producing device to produce a negative pressure in the sub-tank, an air releasing device to release air in the sub-tank, and a detector to detect whether there is ink therein by the difference of electric resistances.

The stimulus is generated by, for example, a stimulus generating device. There is no specific limit to the selection of the stimuli. Heat (temperature), pressure, vibration, and light can be suitably used. These may be used alone or in combination of two or more thereof. Of these, heat and pressure are preferable.

Examples of the device to generate such a stimulus include a heater, a pressurization device, a piezoelectric element, a vibrator, an ultrasonic oscillator, light, etc.

Specific examples thereof include, but are not limited to, a piezoelectric actuator as the piezoelectric element, a thermal actuator that utilizes a phase change caused by film boiling of liquid using an electric heat conversion element such as a heat element, a shape-memory alloy actuator that uses the metal phase change due to temperature change, and an electrostatic actuator that uses an electrostatic force.

There is no specific limit to how the ink is ejected, which differs depending on the kind of the stimulus. For example, in the case in which the stimulus is "heat", a method can be used in which thermal energy corresponding to recording signals is imparted by, for example, a thermal head to generate foams in the ink and the ink is discharged and sprayed as droplets from the nozzles of the recording head by the pressure of the foam. In addition, in a case in which the stimulus is "pressure", for example, a method can be used in which ink is ejected and sprayed from the nozzle holes of a recording head as droplets by applying a voltage to a piezoelectric element attached to the position of a pressure room located in the ink flow path in the recording head, thereby bending the piezoelectric element, resulting in a decrease in the volume of the pressure room.

Of these, it is preferable to eject ink by applying a voltage to a piezoelectric element. No heat is generated by the piezoelectric system, which is advantageous to eject ink containing a resin. This is particularly suitable to subdue clogging in nozzles when ink containing a small amount of wetting agent is used. In addition, to prevent non-ejection of ink caused by clogging of nozzles, it is preferable to conduct false scanning by applying to a piezoelectric element a voltage above which ink is ejected. Furthermore, before false scanning reaching an amount corresponding to one page printing, it is preferable to operate ejection of ink to an ink storing portion. In addition, it is preferable to include a scraper to scrape ink adhering to a receiver of false ejection. Using a wiper or a cutter is preferable as the scraper.

In the present disclosure, an ink whose temperature is controlled to be from 28° C. to 40° C. is ejected. In the present disclosure, it is preferable to control the temperature of the ink to be from 28° C. to 38° C. because images with a high level of gloss can be produced in addition to good ejection properties.

It is preferable to control the temperature of the ink from 28° C. to 40° C. at an ink cartridge, a sub tank, or an ink ejection portion, etc. It is more preferable to control the ink temperature at a sub tank or an ink ejection portion. The temperature can be controlled by typical heating devices (heaters).

The inkjet recording method of the present disclosure includes a step of attaching the ejected ink to a non-porous substrate whose temperature is controlled 5° C. to 20° C. higher than that of the ink.

In this process, the ejected ink is attached to a heated non-porous substrate.

As the heating device (heater), one or more known heating devices suitably selected can be used. For example, the heating device for a forced-air heating, radiation heating, conductive heating, high frequency drying, or microwave drying can be used. Such a heating device can be installed in a typical inkjet printer or externally attached thereto.

The heating temperature in the present disclosure is 5° C. to 20° C. higher than that of the ink. Within this range, it is possible to produce images with a high level of gloss and excellent fixability.

FIGURE is a schematic diagram illustrating the inkjet recording device according to an embodiment of the present disclosure. The following description applies to a serial type (shuttle type) in which the carriage scans but is true for a line-type inkjet recording device having a line type head.

The inkjet recording device illustrated in FIGURE is a serial type inkjet recording device and FIGURE illustrates the inside of the recording device in which a recording head 2, a platen 3, and a roll medium accommodating unit 4 are arranged.

A carriage 15 includes a fluid ejection head to control the ink temperature of each ink of black (K), yellow (Y), magenta (M), and cyan (C) to be from 28° C. to 40° C. by, for example, heating and eject ink droplets.

In addition, the roll medium accommodating unit 4 is a medium feeding device where a roll medium (recording medium) 30 is set.

A transfer device 60 is formed of a transfer roller 34 and a pressing roller 35 which face each other while sandwiching the platen 3 from top and bottom.

While a recording medium 29 is nipped between the transfer roller 34 and the pressing roller 35, the transfer roller 34 is rotated in the direction indicated by the arrow to transfer forward the recording medium 29 transferred onto the platen 3.

In addition, there are provided a pre-heater 40 to preliminarily heat the recording medium 29, which is provided upstream of the platen 3 from the recording medium transfer direction and a print heater 41 (to conduct the first heating process) to heat the recording medium 29 on which ink droplets ejected from nozzles of the recording head are deposited.

The print heater 41 heats the recording medium 29 to a temperature 5° C. to 20° C. higher than that of the ink. The pint heater 41 can be used as the substrate heater.

Moreover, there are provided a transfer roller 48 and a pressing roller 49 downstream of the recording head 2 and a post heater 42 (to conduct the second heating process) downstream of the platen 3. The recording medium 29 is heated subsequently to accelerate drying of the deposited ink droplets.

The pre-heater 40, the print heater 41, and the post heater 42 use conduction heating heater using ceramic or nichrome wire, etc.

Moreover, a hot air fun 43 is provided downstream of the starting point of the post heater 42 serving as the second heating process to conduct the third heating process in which the hot air fun 43 blows hot air to the image-recorded surface of the recording medium 29 on which the ink droplets are deposited. Hot air is directly blown to the ink on the image-recorded surface by the hot air fun 43 so that the ink is completely dried. Thereafter, the recording medium 29 is rolled up by a roll-up roller 39. The reference numeral 70 represents a temperature controller to control the temperature of the ink. The symbol 33 represent pair of rollers.

The target of the image printing conducted by the inkjet recording method of the present disclosure is non-porous substrates. This non-porous substrate is a resin film, laminated paper, coated paper, etc. having a surface formed of plastic materials such as transparent or colored vinyl chloride film, polyethylene terephthalate (PET), acrylic film, polypropylene film, polyimide film, and polystyrene film and free from paper components such as wood pulp paper, Japanese paper, synthesized pulp paper, and synthesized fiber paper.

The inkjet recording method of the present disclosure can be applied to recording by an inkjet recording system, for example, printers, facsimile machines, photocopiers, printer/photocopier multifunction peripherals for inkjet recording in particular.

Having generally described preferred embodiments of this invention, further understanding can be obtained by reference to certain specific examples which are provided herein for the purpose of illustration only and are not intended to be limiting.

EXAMPLES

Next, the present disclosure is described in detail with reference to Examples and Comparative Examples but not limited thereto. In EXAMPLES, % represents % by weight.

Preparation of Pigment Liquid Dispersion A

After preliminarily mixing the following recipe, a pigment liquid dispersion was obtained by conducting circulation dispersion for seven hours by a disk-type bead mill (KDL type, manufactured by SHINMARU ENTERPRISES CORPORATION; Media: zirconia ball having a diameter of 0.3 mm).

| Carbon black pigment (Mitsubishi carbon black #2300, manufactured by Mitsubishi Chemical Corporation): | 15% |
|---|---|
| Anionic surfactant (Pionine A-51-B, manufactured by TAKEMOTO OIL & FAT Co., Ltd.): | 2% |
| Water: | 83% |

Preparation of Polycarbonate-Based Urethane Resin Emulsion B 1,500 g of polycarbonate diol (reaction product of 1,6-hexane diol and dimethyl carbonate), 220 g of 2,2-dimethylol propionic acid (DMPA), and 1,347 g of dipropylene glycol dimethyl ether (boiling point: 171° C.) were charged in a reaction container equipped with a stirrer, a reflux cooling tube, and a thermometer in a nitrogen atmosphere followed by heating to 60° C. to dissolve DMPA.

Thereafter, 1,445 g of 4,4'-dicyclohexyl methane diisocyanate and 2.6 g of dibutyl tin dilaurylate (catalyst) were added followed by heating to 90° C. to conduct urethanification reaction in five hours, thereby obtaining an urethane prepolymer having an isocyanate group at its end.

This reaction mixture was cooled down to 80° C. and 149 g of triethyl amine was admixed therewith. 4,340 g of the resultant mixture was extracted and charged in a liquid mixture of 5,400 g of water and 15 g of triethyl amine while being vigorously stirred.

Thereafter, 1,500 g of ice and 626 g of 35% 2-methyl-1,5-pentane diamine aqueous solution were added to conduct chain elongation reaction followed by distillation away of the solvent in such a manner that the solid portion concentration was 30% to obtain polycarbonate-based urethane resin emulsion B (urethane resin component: 30%, water: 70%).

Example 1

The following recipe was mixed and stirred and thereafter filtered by a polypropylene filter of 0.2 μm to prepare an ink.

| Pigment liquid dispersion A (solid portion 15%, solvent: water): | 20% |
|---|---|
| Polycarbonate-based Urethane Resin Emulsion B (solid portion 30%, solvent: water): | 20% |
| Polyether modified silicone-based surfactant (KF-351A, manufactured by Shin-Etsu Chemical Co., Ltd.): | 2% |
| Propylene glycol (boiling point: 188° C.): | 30% |
| Diethylene glycol n butyl ether (boiling point: 230° C.): | 10% |
| Water: | 17.9% |
| Preservatives and fungicides (PROXEL LV, manufactured by AVECIA GROUP): | 0.1% |

An inkjet printer (remodeled based on IPSiO GXe5500 manufactured by Ricoh Company Ltd.) having a head for inkjet employing a piezo system to eject heated ink, a print heater (sheet heater) to heat a substrate just below the head from the rear side, and a fun heater to dry a printed image was filled with the ink. A nozzle check pattern and a solid image were printed on a non-porous white vinyl chloride sheet (IJ5331, manufactured by 3M Japan Limited) while the ink temperature was set to 34° C., the temperature of the substrate just below the head was 47° C., and the temperature of the fun heater was changed to 80° C.

Example 2

The images were printed by the inkjet printer in the same manner as in Example 1 except that the ink temperature was changed to 34° C. and the temperature of the substrate just below the head was changed to 39° C.

Example 3

The images were printed by the inkjet printer in the same manner as in Example 1 except that the ink temperature was changed to 34° C. and the temperature of the substrate just below the head was changed to 54° C.

Example 4

The images were printed by the inkjet printer in the same manner as in Example 1 except that the ink temperature was changed to 28° C. and the temperature of the substrate just below the head was changed to 40° C.

Example 5

The images were printed by the inkjet printer in the same manner as in Example 1 except that the ink temperature was changed to 28° C. and the temperature of the substrate just below the head was changed to 33° C.

Example 6

The images were printed by the inkjet printer in the same manner as in Example 1 except that the ink temperature was changed to 28° C. and the temperature of the substrate just below the head was changed to 48° C.

Example 7

The images were printed by the inkjet printer in the same manner as in Example 1 except that the ink temperature was changed to 40° C. and the temperature of the substrate just below the head was changed to 52° C.

Example 8

The images were printed by the inkjet printer in the same manner as in Example 1 except that the ink temperature was changed to 40° C. and the temperature of the substrate just below the head was changed to 45° C.

Example 9

The images were printed by the inkjet printer in the same manner as in Example 1 except that the ink temperature was changed to 40° C. and the temperature of the substrate just below the head was changed to 60° C.

Example 10

The images were printed by the inkjet printer in the same manner as in Example 1 except that the ink recipe was changed to the following:

| Pigment liquid dispersion A (solid portion 15%, solvent: water): | 20% |
|---|---|
| Polycarbonate-based Urethane Resin Emulsion B (solid portion 30%, solvent: water): | 20% |
| Polyether modified silicone-based surfactant (KF-351A, manufactured by Shin-Etsu Chemical Co., Ltd.): | 1% |
| Propylene glycol (boiling point: 188° C.): | 30% |
| Diethylene glycol n butyl ether (boiling point: 230° C.): | 10% |
| Water: | 18.9% |

| | |
|---|---|
| Preservatives and fungicides (PROXEL LV, manufactured by AVECIA GROUP): | 0.1% |

Example 11

The images were printed by the inkjet printer in the same manner as in Example 1 except that the ink recipe was changed to the following:

| | |
|---|---|
| Pigment liquid dispersion A (solid portion 15%, solvent: water): | 20% |
| Polycarbonate-based Urethane Resin Emulsion B (solid portion 30%, solvent: water): | 20% |
| Polyether modified silicone-based surfactant (KF-351A, manufactured by Shin-Etsu Chemical Co., Ltd.): | 3% |
| Propylene glycol (boiling point: 188° C.): | 30% |
| Diethylene glycol n butyl ether (boiling point: 230° C.): | 10% |
| Water: | 16.9% |
| Preservatives and fungicides (PROXEL LV, manufactured by AVECIA GROUP): | 0.1% |

Example 12

The images were printed by the inkjet printer in the same manner as in Example 1 except that a transparent PET LSJET transparent PET (manufactured by SAKURAI CO., LTD.) was used as the non-porous substrate instead of the white vinyl chloride sheet (IJ5331, manufactured by 3M Japan Limited).

Example 13

The images were printed by the inkjet printer in the same manner as in Example 1 except that the ink recipe was changed to the following:

| | |
|---|---|
| Pigment liquid dispersion A (solid portion 15%, solvent: water): | 20% |
| Polyether-based Urethane Resin Emulsion (SUPERFLEX ® 130, solid portion 35%, solvent: water, manufactured by DAI-ICHI KOGYO SEIYAKU CO., LTD.): | 18% |
| Polyether modified silicone-based surfactant (KF-351A, manufactured by Shin-Etsu Chemical Co., Ltd.): | 2% |
| Propylene glycol (boiling point: 188° C.): | 30% |
| Diethylene glycol n butyl ether (boiling point: 230° C.): | 10% |
| Water: | 19.9% |
| Preservatives and fungicides (PROXEL LV, manufactured by AVECIA GROUP): | 0.1% |

Example 14

The images were printed by the inkjet printer in the same manner as in Example 1 except that the ink recipe was changed to the following:

| | |
|---|---|
| Pigment liquid dispersion A (solid portion 15%, solvent: water): | 20% |
| Acrylic resin emulsion (JONCRYL ® 537, solid portion 46%, solvent: water, manufactured by BASF SE) | 13% |
| Polyether modified silicone-based surfactant (KF-351A, manufactured by Shin-Etsu Chemical Co., Ltd.): | 2% |
| Propylene glycol (boiling point: 188° C.): | 30% |
| Diethylene glycol n butyl ether (boiling point: 230° C.): | 10% |
| Water: | 24.9% |
| Preservatives and fungicides (PROXEL LV, manufactured by AVECIA GROUP): | 0.1% |

Example 15

The images were printed by the inkjet printer in the same manner as in Example 1 except that the ink recipe was changed to the following:

| | |
|---|---|
| Pigment liquid dispersion A (solid portion 15%, solvent: water): | 20% |
| Polycarbonate-based Urethane Resin Emulsion B (solid portion 30%, solvent: water): | 20% |
| Polyether modified silicone-based surfactant (KF-351A, manufactured by Shin-Etsu Chemical Co., Ltd.): | 2% |
| 2,3-butane diol (boiling point: 183° C.): | 30% |
| Diethylene glycol n butyl ether (boiling point: 230° C.): | 10% |
| Water: | 17.9% |
| Preservatives and fungicides (PROXEL LV, manufactured by AVECIA GROUP): | 0.1% |

Example 16

The images were printed by the inkjet printer in the same manner as in Example 1 except that the ink recipe was changed to the following:

| | |
|---|---|
| Pigment liquid dispersion A (solid portion 15%, solvent: water): | 20% |
| Polycarbonate-based Urethane Resin Emulsion B (solid portion 30%, solvent: water): | 20% |
| Polyether modified silicone-based surfactant (KF-351A, manufactured by Shin-Etsu Chemical Co., Ltd.): | 2% |
| Propylene glycol (boiling point: 188° C.): | 15% |
| 2,3-butane diol (boiling point: 183° C.): | 15% |
| Diethylene glycol n butyl ether (boiling point: 230° C.): | 10% |
| Water: | 17.9% |
| Preservatives and fungicides (PROXEL LV, manufactured by AVECIA GROUP): | 0.1% |

Example 17

The images were printed by the inkjet printer in the same manner as in Example 1 except that the ink recipe was changed to the following:

| | |
|---|---|
| Pigment liquid dispersion A (solid portion 15%, solvent: water): | 20% |
| Polycarbonate-based Urethane Resin Emulsion B (solid portion 30%, solvent: water): | 20% |
| Polyether modified silicone-based surfactant (KF-351A, manufactured by Shin-Etsu Chemical Co., Ltd.): | 2% |
| 1,2-butane diol (boiling point: 194° C.): | 30% |
| Diethylene glycol n butyl ether (boiling point: 230° C.): | 10% |
| Water: | 17.9% |
| Preservatives and fungicides (PROXEL LV, manufactured by AVECIA GROUP): | 0.1% |

Example 18

The images were printed by the inkjet printer in the same manner as in Example 1 except that the ink recipe was changed to the following:

| | |
|---|---|
| Pigment liquid dispersion A (solid portion 15%, solvent: water): | 20% |
| Polycarbonate-based Urethane Resin Emulsion B (solid portion 30%, solvent: water): | 20% |
| Polyether modified silicone-based surfactant (KF-351A, manufactured by Shin-Etsu Chemical Co., Ltd.): | 2% |
| Propylene glycol (boiling point: 188° C.): | 20% |
| Diethylene glycol n butyl ether (boiling point: 230° C.): | 20% |
| Water: | 17.9% |
| Preservatives and fungicides (PROXEL LV, manufactured by AVECIA GROUP): | 0.1% |

Example 19

The images were printed by the inkjet printer in the same manner as in Example 1 except that the ink recipe was changed to the following:

| | |
|---|---|
| Pigment liquid dispersion A (solid portion 15%, solvent: water): | 20% |
| Polycarbonate-based Urethane Resin Emulsion B (solid portion 30%, solvent: water): | 20% |
| Polyether modified silicone-based surfactant (KF-351A, manufactured by Shin-Etsu Chemical Co., Ltd.): | 2% |
| Propylene glycol (boiling point: 188° C.): | 10% |
| Diethylene glycol n butyl ether (boiling point: 230° C.): | 30% |
| Water: | 17.9% |
| Preservatives and fungicides (PROXEL LV, manufactured by AVECIA GROUP): | 0.1% |

Example 20

The images were printed by the inkjet printer in the same manner as in Example 1 except that the ink recipe was changed to the following:

| | |
|---|---|
| Pigment liquid dispersion A (solid portion 15%, solvent: water): | 20% |
| Polycarbonate-based Urethane Resin Emulsion B (solid portion 30%, solvent: water): | 20% |
| Polyether modified silicone-based surfactant (KF-351A, manufactured by Shin-Etsu Chemical Co., Ltd.): | 2% |
| Propylene glycol (boiling point: 188° C.): | 30% |
| Triethylene glycol mono methyl ether (boiling point: 249° C.): | 10% |
| Water: | 17.9% |
| Preservatives and fungicides (PROXEL LV, manufactured by AVECIA GROUP): | 0.1% |

Example 21

The images were printed by the inkjet printer in the same manner as in Example 1 except that the ink recipe was changed to the following:

| | |
|---|---|
| Pigment liquid dispersion A (solid portion 15%, solvent: water): | 20% |
| Polycarbonate-based Urethane Resin Emulsion B (solid portion 30%, solvent: water): | 20% |
| Polyether modified silicone-based surfactant (KF-351A, manufactured by Shin-Etsu Chemical Co., Ltd.): | 2% |
| Propylene glycol (boiling point: 188° C.): | 30% |
| Amide-based solvent (Equamide™ B100, boiling point: 252° C., manufactured by Idemitsu Kosan Co., Ltd.): | 10% |
| Water: | 17.9% |
| Preservatives and fungicides (PROXEL LV, manufactured by AVECIA GROUP): | 0.1% |

Comparative Example 1

The images were printed by the inkjet printer in the same manner as in Example 1 except that the ink recipe was changed to the following:

| | |
|---|---|
| Pigment liquid dispersion A (solid portion 15%, solvent: water): | 20% |
| Polycarbonate-based Urethane Resin Emulsion B (solid portion 30%, solvent: water): | 20% |
| Polyether modified silicone-based surfactant (KF-351A, manufactured by Shin-Etsu Chemical Co., Ltd.): | 0.5% |
| Propylene glycol (boiling point: 188° C.): | 30% |
| Diethylene glycol n butyl ether (boiling point: 230° C.): | 10% |
| Water: | 19.4% |
| Preservatives and fungicides (PROXEL LV, manufactured by AVECIA GROUP): | 0.1% |

Comparative Example 2

The images were printed by the inkjet printer in the same manner as in Example 1 except that the ink recipe was changed to the following:

| | |
|---|---|
| Pigment liquid dispersion A (solid portion 15%, solvent: water): | 20% |
| Polycarbonate-based Urethane Resin Emulsion B (solid portion 30%, solvent: water): | 20% |
| Polyether modified silicone-based surfactant (KF-351A, manufactured by Shin-Etsu Chemical Co., Ltd.): | 4% |
| Propylene glycol (boiling point: 188° C.): | 30% |
| Diethylene glycol n butyl ether (boiling point: 230° C.): | 10% |
| Water: | 15.9% |
| Preservatives and fungicides (PROXEL LV, manufactured by AVECIA GROUP): | 0.1% |

Comparative Example 3

The images were printed by the inkjet printer in the same manner as in Example 1 except that the ink recipe was changed to the following:

| | |
|---|---|
| Pigment liquid dispersion A (solid portion 15%, solvent: water): | 20% |
| Polycarbonate-based Urethane Resin Emulsion B (solid portion 30%, solvent: water): | 20% |
| Fluorine-containing surfactant (ZONYL FS-300, Effective component: 40% manufactured by E. I. du Pont de Nemours and Company): | 2.5% |
| Propylene glycol (boiling point: 188° C.): | 30% |
| Diethylene glycol n butyl ether (boiling point: 230° C.): | 10% |
| Water: | 17.4% |
| Preservatives and fungicides (PROXEL LV, manufactured by AVECIA GROUP): | 0.1% |

Comparative Example 4

The images were printed by the inkjet printer in the same manner as in Example 1 except that the ink recipe was changed to the following:

| | |
|---|---|
| Pigment liquid dispersion A (solid portion 15%, solvent: water): | 20% |
| Polycarbonate-based Urethane Resin Emulsion B (solid portion 30%, solvent: water): | 20% |

-continued

| | |
|---|---|
| Nonionic surfactant (Surfynol 104A, effective component: 50%, manufactured by Air Products and Chemicals, Inc.): | 2% |
| Propylene glycol (boiling point: 188° C.): | 30% |
| Diethylene glycol n butyl ether (boiling point: 230° C.): | 10% |
| Water: | 17.9% |
| Preservatives and fungicides (PROXEL LV, manufactured by AVECIA GROUP): | 0.1% |

Comparative Example 5

The images were printed by the inkjet printer in the same manner as in Example 1 except that the ink recipe was changed to the following:

| | |
|---|---|
| Pigment liquid dispersion A (solid portion 15%, solvent: water): | 30% |
| Polyether modified silicone-based surfactant (KF-351A, manufactured by Shin-Etsu Chemical Co., Ltd.): | 2% |
| Propylene glycol (boiling point: 188° C.): | 30% |
| Diethylene glycol n butyl ether (boiling point: 230° C.): | 10% |
| Water: | 27.9% |
| Preservatives and fungicides (PROXEL LV, manufactured by AVECIA GROUP): | 0.1% |

Comparative Example 6

The images were printed by the inkjet printer in the same manner as in Example 1 except that the ink temperature was changed to 23° C. and the temperature of the substrate just below the head was changed to 35° C.

Comparative Example 7

The images were printed by the inkjet printer in the same manner as in Example 1 except that the ink temperature was changed to 45° C. and the temperature of the substrate just below the head was changed to 57° C.

Comparative Example 8

The images were printed by the inkjet printer in the same manner as in Example 1 except that the ink temperature was changed to 34° C. and the temperature of the substrate just below the head was changed to 34° C.

Comparative Example 9

The images were printed by the inkjet printer in the same manner as in Example 1 except that the ink temperature was changed to 34° C. and the temperature of the substrate just below the head was changed to 59° C.

Comparative Example 10

The images were printed by the inkjet printer in the same manner as in Example 1 except that a porous substrate (MyPaper, manufactured by Ricoh Company. LTD.) was used instead of the non-porous substrate of white vinyl chloride sheet (IJ5331, manufactured by 3M Japan Limited).

Formulations of the inks of Examples 1 to 21 and Comparative Examples 1 to 10 are shown in Table 1.

TABLE 1

| | Pigment liquid dispersion A | Polycarbonate-based urethane resin Emulsion B | Polyether-based urethane resin emulsion SUPERFLEX® 130 | Acrylic resin emulsion JONCRYL® 537 (manufactured by BASF SE) | Polyether-modified silicone-based surfactant: KF-351A | Fluorine-containing surfactant: ZONYL FS-300 | Nonionic surfactant Surfynol 104A | Propylene glycol (boiling point: 188° C.) |
|---|---|---|---|---|---|---|---|---|
| Example 1 | 20 | 20 | | | 2 | | | 30 |
| Example 2 | | | | | | | | |
| Example 3 | | | | | | | | |
| Example 4 | | | | | | | | |
| Example 5 | | | | | | | | |
| Example 6 | | | | | | | | |
| Example 7 | | | | | | | | |
| Example 8 | | | | | | | | |
| Example 9 | | | | | | | | |
| Example 10 | 20 | 20 | | | 1 | | | 30 |
| Example 11 | 20 | 20 | | | 3 | | | 30 |
| Example 12 | Same as Example 1 except that substrate was changed to transparent PET | | | | | | | |
| Example 13 | 20 | | 18 | | 2 | | | 30 |
| Example 14 | 20 | | | 13 | 2 | | | 30 |
| Example 15 | 20 | 20 | | | 7 | | | |
| Example 16 | 20 | 20 | | | 2 | | | 15 |
| Example 17 | 20 | 20 | | | 2 | | | |
| Example 18 | 20 | 20 | | | 2 | | | 20 |
| Example 19 | 20 | 20 | | | 2 | | | 10 |
| Example 20 | 20 | 20 | | | 2 | | | 30 |
| Example 21 | 20 | 20 | | | 2 | | | 30 |
| Comparative Example 1 | 20 | 20 | | | 0.5 | | | 30 |
| Comparative Example 2 | 20 | 20 | | | 4 | | | 30 |
| Comparative Example 3 | 20 | 20 | | | | 2.5 | | 30 |
| Comparative Example 4 | 20 | 20 | | | | | 2 | 30 |
| Comparative Example 5 | 30 | | | | 2 | | | 30 |

TABLE 1-continued

| | |
|---|---|
| Comparative Example 6 | Same as Example 1 |
| Comparative Example 7 | Same as Example 1 |
| Comparative Example 8 | Same as Example 1 |
| Comparative Example 9 | Same as Example 1 |
| Comparative Example 10 | Same as Example 1 except that substrate was changed to porous substrate |

| | 2,3-butane diol (boiling point 194° C.) | 1,2-butane diol (boiling point 194° C.) | Diethylene glycol n-butyl ether (boiling point 230° C.) | Triethylene glycol mono methyl ether (boiling point 249° C.) | Amide-based solvent Equamide™ B100 boiling point: 252° C. manufactured by Idemitsu Kosan Co., Ltd. | Water | Preservatives and fungicides PROXEL LV |
|---|---|---|---|---|---|---|---|
| Example 1 | | | 10 | | | 17.9 | 0.1 |
| Example 2 | | | | | | | |
| Example 3 | | | | | | | |
| Example 4 | | | | | | | |
| Example 5 | | | | | | | |
| Example 6 | | | | | | | |
| Example 7 | | | | | | | |
| Example 8 | | | | | | | |
| Example 9 | | | | | | | |
| Example 10 | | | 10 | | | 18.9 | 0.1 |
| Example 11 | | | 10 | | | 16.9 | 0.1 |
| Example 12 | Same as Example 1 except that substrate was changed to transparent PET | | | | | | |
| Example 13 | | | 10 | | | 19.9 | 0.1 |
| Example 14 | | | 10 | | | 24.9 | 0.1 |
| Example 15 | 30 | | 10 | | | 17.9 | 0.1 |
| Example 16 | 15 | | 10 | | | 17.9 | 0.1 |
| Example 17 | | 30 | 10 | | | 17.9 | 0.1 |
| Example 18 | | | 20 | | | 17.9 | 0.1 |
| Example 19 | | | 30 | | | 17.9 | 0.1 |
| Example 20 | | | | 10 | | 17.9 | 0.1 |
| Example 21 | | | | | 10 | 17.9 | 0.1 |
| Comparative Example 1 | | | 10 | | | 19.4 | 0.1 |
| Comparative Example 2 | | | 10 | | | 15.9 | 0.1 |
| Comparative Example 3 | | | 10 | | | 17.4 | 0.1 |
| Comparative Example 4 | | | 10 | | | 17.9 | 0.1 |
| Comparative Example 5 | | | 10 | | | 27.9 | 0.1 |
| Comparative Example 6 | Same as Example 1 | | | | | | |
| Comparative Example 7 | Same as Example 1 | | | | | | |
| Comparative Example 8 | Same as Example 1 | | | | | | |
| Comparative Example 9 | Same as Example 1 | | | | | | |
| Comparative Example 10 | Same as Example 1 except that substrate was changed to porous substrate | | | | | | |

| | Total of Component | Ejected ink temperature (T1) | Substrate temperature (T2) | T2 − T1 |
|---|---|---|---|---|
| Example 1 | 100 | 34 | 47 | 13 |
| Example 2 | | 34 | 39 | 5 |
| Example 3 | | 34 | 54 | 20 |
| Example 4 | | 28 | 40 | 12 |
| Example 5 | | 28 | 33 | 5 |
| Example 6 | | 28 | 48 | 20 |
| Example 7 | | 40 | 52 | 12 |
| Example 8 | | 40 | 45 | 5 |
| Example 9 | | 40 | 60 | 20 |
| Example 10 | 100 | 34 | 47 | 13 |
| Example 11 | 100 | 34 | 47 | 13 |
| Example 12 | | 34 | 47 | 13 |
| Example 13 | 100 | 34 | 47 | 13 |
| Example 14 | 100 | 34 | 47 | 13 |
| Example 15 | 100 | 34 | 47 | 13 |

TABLE 1-continued

| | | | | |
|---|---|---|---|---|
| Example 16 | 100 | 34 | 47 | 13 |
| Example 17 | 100 | 34 | 47 | 13 |
| Example 18 | 100 | 34 | 47 | 13 |
| Example 19 | 100 | 34 | 47 | 13 |
| Example 20 | 100 | 34 | 47 | 13 |
| Example 21 | 100 | 34 | 47 | 13 |
| Comparative Example 1 | 100 | 34 | 47 | 13 |
| Comparative Example 2 | 100 | 34 | 47 | 13 |
| Comparative Example 3 | 100 | 34 | 47 | 13 |
| Comparative Example 4 | 100 | 34 | 47 | 13 |
| Comparative Example 5 | 100 | 34 | 47 | 13 |
| Comparative Example 6 | | 23 | 35 | 12 |
| Comparative Example 7 | | 45 | 57 | 12 |
| Comparative Example 8 | | 34 | 34 | 0 |
| Comparative Example 9 | | 34 | 59 | 25 |
| Comparative Example 10 | | 34 | 47 | 13 |

The following evaluations were made about each ink of Examples 1 to 21 and Comparative Examples 1 to 10. The results are shown in Table 2.

Evaluation on Non-Ejection by Nozzle

The number of nozzles that had not ejected ink was counted in the nozzle check pattern.

Evaluation of Image Gloss

Gloss at 60° of the solid image was measured by a gloss meter (4501, manufactured by BYK Gardener). A larger reading on gloss level means better gloss.

Fixability Evaluation

The solid image was abraded by dried cotton (unbleached muslin No. 3) with a load of 400 g to check the number of abrasion times at which the density of the solid image decreased. A larger number of abrasion means better fixability.

TABLE 2

| | Evaluation result | | |
|---|---|---|---|
| | Non-ejection by nozzle | Image gloss | Fixability |
| Example 1 | 0 | 102 | 58 |
| Example 2 | 0 | 105 | 52 |
| Example 3 | 1 | 95 | 63 |
| Example 4 | 0 | 104 | 54 |
| Example 5 | 0 | 109 | 50 |
| Example 6 | 0 | 101 | 60 |
| Example 7 | 3 | 96 | 65 |
| Example 8 | 2 | 100 | 59 |
| Example 9 | 4 | 92 | 71 |
| Example 10 | 5 | 91 | 61 |
| Example 11 | 0 | 89 | 52 |
| Example 12 | 0 | 112 | 63 |
| Example 13 | 0 | 88 | 51 |
| Example 14 | 0 | 84 | 55 |
| Example 15 | 0 | 105 | 56 |
| Example 16 | 0 | 108 | 62 |
| Example 17 | 0 | 100 | 51 |
| Example 18 | 1 | 88 | 57 |
| Example 19 | 1 | 82 | 51 |
| Example 20 | 1 | 86 | 49 |
| Example 21 | 1 | 81 | 46 |
| Comparative Example 1 | 17 | 53 | 56 |
| Comparative Example 2 | 0 | 48 | 32 |
| Comparative Example 3 | 35 | 35 | 30 |
| Comparative Example 4 | 32 | 34 | 28 |
| Comparative Example 5 | 0 | 16 | 2 |
| Comparative Example 6 | 16 | 81 | 34 |
| Comparative Example 7 | 8 | 44 | 66 |
| Comparative Example 8 | 0 | 51 | 55 |
| Comparative Example 9 | 0 | 47 | 64 |
| Comparative Example 10 | 0 | 36 | 16 |

As seen in the results shown in Table 1, the inkjet recording method of the present disclosure secures high ejection reliability and gloss with image fixability.

According to the present invention, an inkjet recording method is provided by which high performance of image printing is possible since the printed portion has a high level of image gloss when printed on a heated non-porous substrate while lowering occurrence of bad ejection.

Having now fully described embodiments of the present invention, it will be apparent to one of ordinary skill in the art that many changes and modifications can be made thereto without departing from the spirit and scope of embodiments of the invention as set forth herein.

What is claimed is:

1. An inkjet recording method comprising:
    ejecting an ink having a temperature in a range of 28° C. to 40° C.; and
    attaching the ink to a non-porous substrate having a temperature 5° C. to 20° C. higher than that of the ink;

wherein the ink comprises a colorant, resin particles, water, a hydrosoluble organic solvent, and a silicone-based surfactant, wherein the silicone-based surfactant accounts for 1% by weight to 3% by weight in the ink.

2. The inkjet recording method according to claim 1, wherein, in the step of ejecting an ink having a temperature from 28° C. to 40° C., the ink is heated to 28° C. to 40° C.

3. The inkjet recording method according to claim 1, wherein the resin particles comprise a polycarbonate-based urethane resin.

4. The inkjet recording method according to claim 1, wherein the hydrosoluble organic solvent comprises at least one of propylene glycol or 2,3-butane diol.

5. The inkjet recording method according to claim 1, wherein 50% by weight or more of the hydrosoluble organic solvent has a boiling point lower than 200° C.

6. The inkjet recording method according to claim 1, wherein the hydrosoluble organic solvent has a boiling point of 250° C. or lower.

7. Inkjet printed matter comprising:
a recording medium; and
an image formed on the recording medium by utilizing the inkjet recording method of claim 1.

8. An inkjet recording device comprising:
an ink comprising:
   a colorant;
   resin particles;
   water;
   a hydrosoluble organic solvent; and
   a silicone-based surfactant accounting for 1% by weight to 3% by weight in the ink;
a temperature controller to control a temperature of the ink to be in a range of 28° C. to 40° C.;
an ejection device to eject the ink; and
a substrate heater to heat a substrate to a temperature 5° C. to 20° C. higher than that of the ink.

\* \* \* \* \*